US012720377B2

(12) United States Patent
Chang et al.

(10) Patent No.: US 12,720,377 B2
(45) Date of Patent: Aug. 25, 2026

(54) HANDOVER INFORMATION REPORTING METHOD AND USER EQUIPMENT

(71) Applicant: Sharp Kabushiki Kaisha, Sakai City (JP)

(72) Inventors: Ningjuan Chang, Shanghai (CN); Fangying Xiao, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 303 days.

(21) Appl. No.: 18/014,198

(22) PCT Filed: Jul. 5, 2021

(86) PCT No.: PCT/CN2021/104506
§ 371 (c)(1),
(2) Date: Jan. 3, 2023

(87) PCT Pub. No.: WO2022/012363
PCT Pub. Date: Jan. 20, 2022

(65) Prior Publication Data
US 2023/0262542 A1 Aug. 17, 2023

(30) Foreign Application Priority Data
Jul. 13, 2020 (CN) ........................ 202010671613.3

(51) Int. Cl.
*H04W 36/00* (2009.01)
*H04W 36/08* (2009.01)
(Continued)

(52) U.S. Cl.
CPC ....... *H04W 36/0069* (2018.08); *H04W 36/08* (2013.01); *H04W 36/305* (2018.08); *H04W 76/20* (2018.02)

(58) Field of Classification Search
CPC ............. H04W 36/0069; H04W 36/08; H04W 36/305; H04W 76/20; H04W 36/185;
(Continued)

(56) References Cited

U.S. PATENT DOCUMENTS

2013/0223205 A1* 8/2013 Chuang ............... H04W 36/324 370/225
2022/0141725 A1* 5/2022 Parichehrehteroujeni .................. H04W 36/00837 370/331

(Continued)

FOREIGN PATENT DOCUMENTS

CN 102685672 A 9/2012
CN 111083751 A 4/2020

OTHER PUBLICATIONS

Official Communication issued in International Patent Application No. PCT/CN2021/104506, mailed on Sep. 29, 2021.

(Continued)

*Primary Examiner* — Thomas R Cairns
*Assistant Examiner* — Raenita Ann Fenner
(74) *Attorney, Agent, or Firm* — Keating & Bennett, LLP

(57) ABSTRACT

Provided in the present disclosure are a handover information reporting method and user equipment. The handover information reporting method includes: successfully executing, by user equipment (UE), a handover from a source base station to a target base station; and transmitting, by the UE, to the target base station a radio resource control (RRC) message including handover report information, the handover report information including an information element for indicating a radio link control (RLC) retransmission status, and the RLC retransmission status being a maximum value of a count value RETX_COUNT of an RLC layer of the UE for recording the number of retransmissions of an (Continued)

RLC service data unit (SDU) or an RLC protocol data unit (PDU).

4 Claims, 2 Drawing Sheets

(51) Int. Cl.
*H04W 36/30* (2009.01)
*H04W 76/20* (2018.01)

(58) Field of Classification Search
CPC ................ H04W 24/02; H04W 24/10; H04W 36/00833; H04W 36/0058; H04W 36/0077; H04W 36/0085
See application file for complete search history.

(56) References Cited

U.S. PATENT DOCUMENTS

2022/0279403 A1 9/2022 Yang et al.
2022/0369171 A1* 11/2022 Kim .................. H04W 36/0011
2022/0386204 A1* 12/2022 Parichehrehteroujeni .................. H04W 36/18
2023/0189374 A1* 6/2023 Ramachandra ....... H04W 76/19 370/329
2023/0232298 A1* 7/2023 Parichehrehteroujeni .................. H04W 36/0058 370/331

OTHER PUBLICATIONS

"3rd Generation Partnership Project; Technical Specification Group Radio Access Network; NR: Radio Resource Control (RRC) protocol specification (Release 16)", 3GPP TS 38.331 V16.0.0, Mar. 2020, pp. 1-835.
CMCC, "New WID on enhancement of data collection for SON/MDT in NR", 3GPP TSG RAN Meeting #86, RP-193255, Dec. 9-12, 2019, 5 pages.
CATT (Rapporteur), "Output of Email Discussion [107#45][NRSON] RACH and Mobility Robustness Optimisation Checking", 3GPP TSG-RAN WG2 Meeting #107bis, R2-1912147, Oct. 14-18, 2019, 38 pages.
Vivo, "UE reporting for mobility optimization", 3GPP TSG-RAN WG2 Meeting #107bis, R2-1912438, Oct. 14-18, 2019, 4 pages.
"3rd Generation Partnership Project; Technical Specification Group Radio Access Network; Study on RAN-centric data collection and utilization for LTE and NR (Release 16)", 3GPP TR 37.816 V16.0.0, Jul. 2019, pp. 1-35.
Vivo, "Discussion on the RLF and HOF for DAPS", 3GPP TSG-RAN WG2 Meeting #107, R2-1909775, Aug. 26-30, 2019, 8 pages.

* cited by examiner

HANDOVER INFORMATION REPORTING METHOD AND USER EQUIPMENT

TECHNICAL FIELD

The present disclosure relates to the technical field of wireless communications. More specifically, the present disclosure relates to a handover information reporting method in the case of a handover and corresponding user equipment.

BACKGROUND

A new research project on Release 17 technology standards (see non-patent literature: RP-193255: New WID on enhancement of data collection for SON/MDT in NR) was approved in the 3rd Generation Partnership Project (3GPP) RAN #86 plenary session held in December 2019. The research objective of this project is to enhance a network data collection procedure in an NR system so as to better achieve the objective of a self-organizing, self-optimizing network and minimization of drive tests. One of the specific techniques of the research is to achieve handover information reporting in a successful handover scenario.

The present disclosure provides a solution to the issue of how to implement handover information reporting in an NR system.

SUMMARY

An objective of embodiments of the present disclosure is to provide a solution to the issue of how to implement handover information reporting in an NR system. More specifically, the present disclosure provides a solution to the issue of how to record or report relevant information in a handover procedure after UE has successfully completed a conventional handover or a Dual Active Protocol Stack (DAPS) handover or a Conditional HandOver (CHO). Specifically, provided in the present disclosure are a handover information reporting method performed by user equipment and corresponding user equipment.

According to a first aspect of the present disclosure, provided is a handover information reporting method, comprising: successfully executing, by user equipment (UE), a handover from a source base station to a target base station; and transmitting, by the UE, to the target base station a radio resource control (RRC) message comprising handover report information, the handover report information comprising an information element for indicating a radio link control (RLC) retransmission status, and the RLC retransmission status being a maximum value of a count value RETX_COUNT of an RLC layer of the UE for recording the number of retransmissions of an RLC service data unit (SDU) or an RLC protocol data unit (PDU).

In the above handover information reporting method, the handover executed by the UE may be a dual active protocol stack (DAPS) handover, and the handover report information may further comprise at least one of the following information: information 1: an RLC retransmission status value related to the source base station upon successful completion of the handover; information 2: a T310 operation status value related to the source base station upon successful completion of the handover; information 3: a beam monitoring situation related to the source base station upon successful completion of the handover; information 4: information for indicating a radio link failure (RLF) at the source base station; information 5: an RLC retransmission status value related to the source base station when source base station releasing is performed upon receipt of an RRC message comprising a source base station releasing instruction; information 6: a T310 operation status value related to the source base station when source base station releasing is performed upon receipt of an RRC message comprising a source base station releasing instruction; and information 7: a beam monitoring situation related to the source base station when source base station releasing is performed upon receipt of an RRC message comprising a source base station releasing instruction.

In the above handover information reporting method, the handover executed by the UE may be a conditional handover, and the handover report information comprises at least one of the following information: information 1: a measurement result acquired for an execution condition of each conditional handover configuration upon initiation of the handover; information 2: a status of an execution condition corresponding to each conditional handover configuration upon initiation of the handover; information 3: a list of all conditional handover candidate cells meeting a corresponding execution condition in a conditional handover configuration upon initiation of the handover, i.e., a conditional handover triggering cell list; and information 4, used to indicate that a stored RRC reconfiguration message corresponding to a handover candidate cell and applied due to execution of a conditional handover procedure is generated in a cell selection procedure performed during operation of T311.

In the above handover information reporting method, success of the handover means that an RRC reconfiguration complete message for responding to a handover command RRC reconfiguration message with respect to the target base station has been successfully transmitted, or that a random access procedure to the target base station has been successfully completed at a medium access control (MAC) layer.

In the above handover information reporting method, the RLC SDU or the RLC PDU may be related to all radio bearers comprising a data radio bearer (DRB) and a signaling radio bearer (SRB), or may be related to all DRBs.

In the above handover information reporting method, if the UE is configured with and has activated carrier aggregation duplication, the RLC SDU or the RLC PDU may not comprise an RLC SDU or RLC PDU of which corresponding logical channel allowed serving cells comprise only a secondary cell (SCell), or the RLC SDU or PDU may not comprise an RLC SDU or RLC PDU of which corresponding logical channel allowed serving cells comprise a secondary cell (SCell).

In the above handover information reporting method, the beam monitoring situation may comprise: a beam failure instance count value BFI_COUNTER, a status/value of a beam failure monitoring timer, and a measured value of a reference signal for beam failure monitoring.

In the above handover information reporting method, the handover report information may further comprise cell identifiers and/or carrier frequency information corresponding to the source base station and the target base station.

In the above handover information reporting method, after receiving an RRC message from the target base station comprising an instruction for requesting reporting of the handover report information, the UE may transmit the handover report information to the target base station.

According to a second aspect of the present disclosure, provided is user equipment (UE), comprising: a processor; and a memory storing instructions, wherein the instructions, when run by the processor, perform the handover information reporting method described herein.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figures 1, 2:
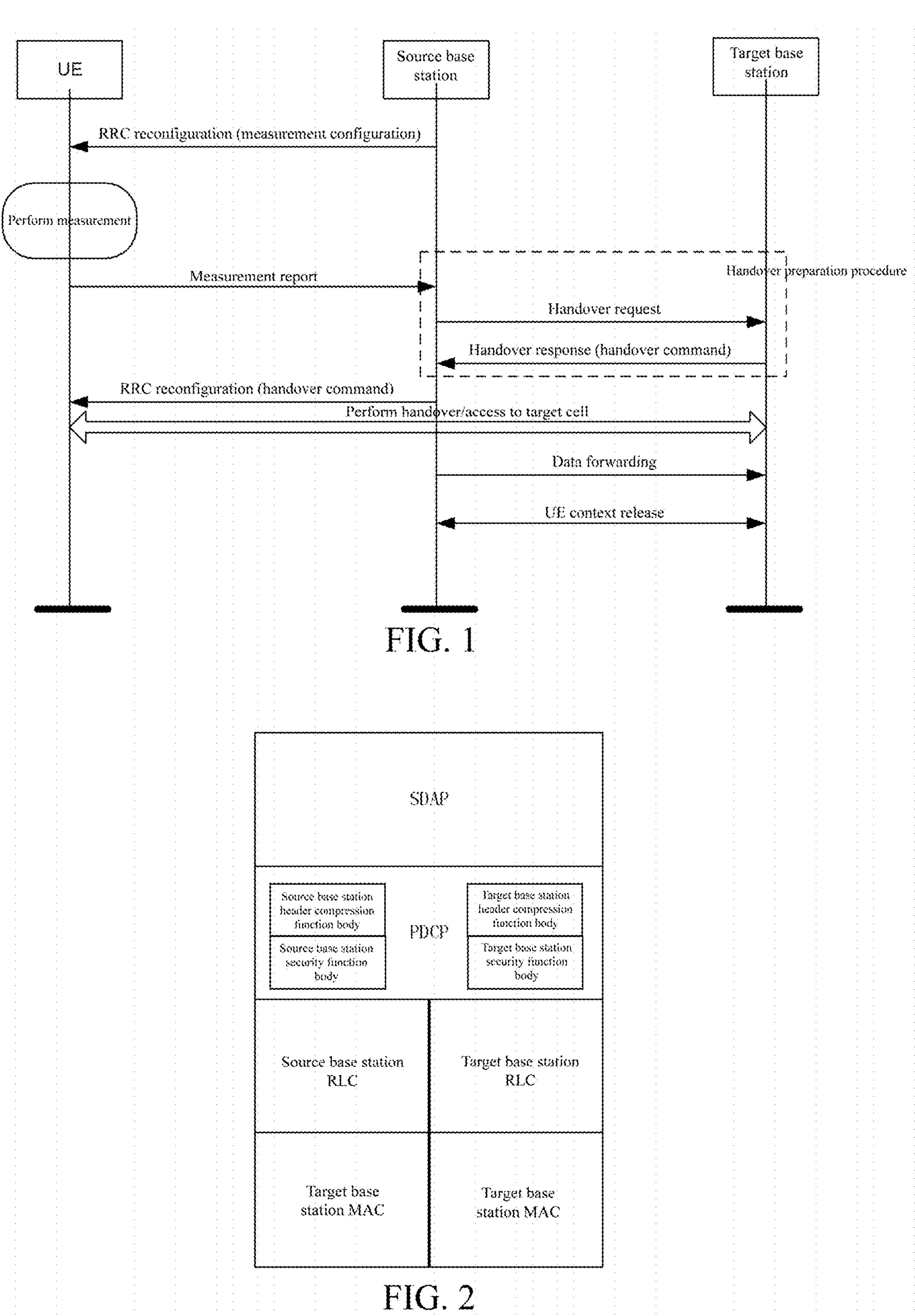
FIG. 1 is a sequence diagram showing that user equipment (UE) in a connected state changes a serving cell by means of a handover procedure.
FIG. 2 is a schematic diagram showing a user plane protocol stack in a dual active protocol stack configuration.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" may have an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of the primary cell and intra-cell change of the primary cell. That is, a primary cell of UE is changed from a source cell to a target cell, where the source cell and the target cell may be the same cell or different cells. In this procedure, a security key or keys or a security algorithm for access layer security may also be accordingly updated. The security includes encryption and decryption and integrity protection. The source cell may also be referred to as a source base station, or a source beam, a source transmission point (TRP), a source primary cell (PCell), or a source master cell group (MCG), and the target cell may also be referred to as a target base station, or a target beam, a target transmission point, a target primary cell (PCell), or a target master cell group (MCG). The source cell refers to a connected cell serving the UE before a handover procedure is initiated, namely, a cell transmitting to the UE an RRC message including a handover command. The target cell refers to a cell connected to and serving the UE after the handover procedure is successfully completed, or a cell indicated by a target cell identifier included in the handover command, or a cell that performs downlink synchronization and random access in the handover procedure. The handover command described in the present disclosure is used to trigger the UE to execute a handover. In an NR system, the handover command is an RRC reconfiguration message including a synchronized reconfiguration (Reconfigurationwithsync) information element, or rather, the handover command is an RRC reconfiguration message including a synchronized reconfiguration (Reconfigurationwithsync) information element for a master cell group (MCG). In this case, the handover may also be referred to as an MCG synchronized reconfiguration. In an LTE system, the handover command is an RRC connection reconfiguration message including a mobility control information (MobilityControlInfo) information element. The synchronized reconfiguration information element or the mobility control information information element may include configuration information of the target cell, for example, a target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. The handover command is equivalent to an RRC message including the handover command, and refers to an RRC message or a configuration in the RRC message triggering the UE to execute a handover. The handover configuration refers to all or part of configurations in the handover command "Cancel", "release", "delete", "flush", and "clear" are interchangeable. "Execute", "use", and "apply" are interchangeable. "Configure" and "reconfigure" are interchangeable. "Monitor" and "detect" are interchangeable. An RRC re-establishment message is equivalent to an RRC connection re-establishment message; similarly, an RRC re-establishment complete message serving as a response message thereto is equivalent to an RRC connection re-establishment complete message.

The following describes processes or concepts in the prior art to which the present disclosure relates.

Handover Configuration in NR Systems:

In an NR system, an RRC reconfiguration message for a handover command carries RRC configurations from a target base station, including but not limited to the following RRC configurations (see Section 6.2.2 of 3GPP Technical Standard Protocol 38.331 for details):

A measurement configuration (measconfig information element): used to configure intra-frequency, inter-frequency, and inter-radio access technology measurements performed by UE, for example, a measurement object configuration, a measurement report configuration, a measurement gap configuration, etc.

A cell group configuration (cellGroupConfig information element), used to configure a master cell group or a secondary cell group, including a radio link control (RLC) bearer configuration (an rlc-bearerToAddModList information element and an rlc-bearerToreleaselist information element), a medium access control (MAC) configuration (a MAC-cellgroupconfig information element), a physical layer configuration, a secondary cell addition/modification/release configuration, a special cell (SpCell) configuration, etc. corresponding to a data radio bearer/signaling radio bearer. The sPCell configuration includes a cell index number, handover information (reconfigurationWithSync information element), a radio link failure related timer and constant configuration, a radio link monitoring (RLM) configuration, a special cell dedicated configuration, etc. The reconfigurationwithsync information element is similar to the mobility control information in the LTE system and includes handover related information to implement mobility, and the information element includes serving cell configuration common information, a cell radio network temporary identifier (C-RNTI) of the UE in the target cell, configurations of a handover procedure monitoring timer T304, a random access dedicated configuration for a random access procedure to the target cell.

Non-access stratum dedicated information (dedicatedInfoNASList information element).

A radio bearer configuration (radiobearerConfig information element), used to configure a Service Data Application Protocol layer (SDAP) and a Packet Data Convergence Protocol layer (PDCP) of a Data Radio Bearer (DRB) and/or a Signaling Radio Bearer (SRB).

A master key update configuration (masterKeyupdate information element).

General Handover Procedure in NR Systems:

User mobility in a connected state is implemented mainly by means of a handover procedure, and the handover refers to a procedure in which UE in an RRC connected state changes a serving cell (primary cell). FIG. 1 is a sequence diagram showing that user equipment (UE) in a connected state changes a serving cell by means of a handover procedure. As shown in FIG. 1, the handover procedure generally includes the following phases:

Phase 1, a measurement phase. A base station issues a measurement configuration to user equipment (UE); the UE performs, on the basis of the measurement configuration, measurement on a radio link corresponding to a serving cell or a neighboring cell; when a configured measurement reporting condition is met, the UE transmits a measurement report to the base station. The measurement phase is not mandatory, and the base station may also perform a blind handover to UE if the base station does not have any valid measurement report.

Phase 2, a handover preparation phase. The base station determines, according to the received measurement report and other factors such as load of the base station, whether to trigger a handover for the UE. If it is determined to trigger a handover for the UE, then a source base station initiates a handover preparation procedure by transmitting a handover request message to a target base station. The target base station determines, according to the context of the UE in the handover request message, available resources of the target base station, and other factors, whether to accept this handover request of the UE. If so, then the target base station replies to the source base station with a handover acknowledgment message, wherein the handover acknowledgment message includes an inter-node RRC message, namely, a handover command.

Phase 3, a handover execution phase. The source base station issues the handover command to the UE, and starts to forward data of the UE to the target base station. The UE receiving the handover command immediately uses a configuration in the handover command to execute a handover, accesses the target base station by means of a random access procedure, and transmits an acknowledgment message to the target base station. The random access procedure is not mandatory. When the UE performs access to the target base station, the UE stops radio link situation monitoring (also referred to as radio link failure (RLF) monitoring) for a source base station link.

Phase 4, a handover completion phase. After confirming that the UE successfully accesses the target base station, the target base station transmits a handover complete message to the source base station. According to the handover complete message, the source base station may release the UE context stored thereon.

Radio Link Failure (RLF):

The UE considers that an RLF has occurred when one of the following conditions occurs: a timer T310 used for RLF monitoring expires, a timer T312 used for fast RLF monitoring expires, an indication of a random access problem is received from a MAC layer, and an indication used to indicate that the maximum number of RLC retransmissions has been reached is received from an RLC entity. During the DAPS handover, if the above timers, MAC entity, and RLC are associated with the source base station MCG, it is considered that a source base station MCG RLF (a source base station RLF for short) has been detected; if the above timers, MAC entity, and RLC are associated with the target base station MCG, it is considered that a target base station MCG RLF has been detected. In the case of single connectivity or dual connectivity, if the above timers, MAC entity, and RLC are associated with the MCG, it is considered that an MCG RLF is detected. In dual connectivity (DC), the UE is configured with a secondary cell group (SCG), and if the above timers, MAC entity, and RLC are associated with the SCG, it is considered that an SCG RLF has been detected.

Dual Active Protocol Stack (DAPS) Handover:

The DAPS handover introduced in Release 16 refers to a handover procedure in which UE, after receiving an RRC message for handover, still maintains a connection to a source base station until the source base station is released after a random access procedure for a target base station is successfully performed. In this procedure, for a bearer configured with DAPS, the UE continues receiving downlink data from the source base station until the source base station is released, and the user continues transmitting uplink data to the source base station until the random access procedure to the target base station is successfully completed. After the random access procedure to the target base station is completed, a MAC layer indicates to an upper layer that the random access procedure is completed, and after receiving the indication, an RRC layer instructs a lower layer (e.g., a PDCP layer) to perform an uplink data change, and to change an uplink path from the source base station to the target base station. When the PDCP layer is requested to perform the uplink data change, the PDCP layer submits a PDCP data protocol data unit (PDU) to an RLC entity associated with the target base station, submits a PDCP control PDU associated with the source base station to an RLC entity associated with the source base station, and submits a PDCP control PDU associated with the target base station to an RLC entity associated with the target base station.

In the case of the DAPS handover, after receiving a handover command, the UE establishes a MAC entity for the target base station. If a DRB is configured as a DAPS bearer, the UE establishes for the DRB an RLC entity and a dedicated traffic logical channel (DTCH) associated with the target base station, reconfigures a PDCP entity associated with the DAPS bearer as a DAPS PDCP entity which is a PDCP entity that has security and robust header compression (ROHC) functions respectively associated with the source base station and the target base station, and respectively associates the security and ROHC functions with the corresponding RLC entities configured for the source base station and the target base station. FIG. 2 is a schematic diagram showing a user plane protocol stack in a dual active protocol stack configuration. As shown in FIG. 2, in the above manner, during the DAPS handover procedure, the UE maintains active protocol stacks for the source base station and the target base station at the same time. The DAPS handover may be replaced with a handover procedure in which an arbitrary DRB is configured to be a DAPS bearer.

During the DAPS handover procedure, the UE continuously maintains the radio link situation monitoring for the source base station link. If it is detected that a radio link failure occurs at the source base station, the UE will suspend transmission of all DRBs of the source base station, reset the MAC entity, and release the connection to the source base station. When the DAPS handover succeeds, the UE receives an RRC reconfiguration message transmitted from the target base station, which carries instruction information (e.g., identified by a daps-SourceRelease information element) used to instruct release of the source base station. After receiving the instruction, the UE performs an operation of releasing a source base station configuration and protocol stack, and falls back to a single active protocol stack state in which only the connection to the target base station is maintained.

Conditional HandOver (CHO)

A conditional handover is also referred to as a conditional (re)configuration or a conditional synchronized reconfiguration. In the conventional handover procedure, one reason for a handover failure and therefore a long data transmission interruption is a handover command receiving failure caused when the handover command is not delivered in a timely manner One feasible approach to address this problem is a conditional handover. In the conditional handover, a relatively conservative measurement report threshold is set, so that a base station acquires a measurement result in advance, and performs handover preparation with a selected target base station in advance according to the measurement result. In this case, the base station can issue a handover command including a handover candidate cell and a handover execution condition to UE before an actual handover condition (relative to the conservative measurement report threshold) is met, wherein the handover command carries a condition for executing a handover by the UE. Different from the existing handover function, after receiving the conditional handover command, the UE does not execute a handover immediately but stores a received handover command configuration (e.g., a VarConditionalReconfig information element), and starts to monitor the link quality of a source cell or the link quality of a target cell according to the handover execution condition carried in the handover command message, and to evaluate whether the handover execution condition is met (referred to as conditional reconfiguration evaluation). Only when it is determined, by means of monitoring, that the configured handover execution condition is met, does the UE start to execute the stored handover configuration and access the target cell. In summary, the conditional handover refers to a handover procedure that is executed only when one or more configured handover execution conditions are met. The handover condition may be a measurement event. The UE may be configured with multiple conditional handover configurations simultaneously, i.e., multiple conditional handover candidate cells and conditional handover commands (an RRC reconfiguration message including a synchronized reconfiguration information element) and execution conditions corresponding thereto. Each conditional handover configuration is indicated by one conditional handover identifier (e.g., a conReconfigId information element) in a conditional handover configuration list. For one conditional handover candidate cell, the execution condition may be a measurement configuration indicated by one or more (e.g. two) measurement identifiers, each measurement identifier having a corresponding measurement event configuration. Only when measurement events corresponding to all configured measurement identifiers are satisfied, does the UE use the candidate cell as a handover triggering cell. If multiple handover triggering cells are present simultaneously, the UE selects one handover triggering cell as the target cell according to a certain criterion, such as the best link signal, etc., so as to initiate a conditional handover execution procedure to perform random access to the target cell.

Radio Link Failure Reporting Function in the Existing Mechanism:

In a current LTE system and an NR system of Release 16, UE will generate and store a radio link failure report (RLF report) when a link failure occurs. After connection to a network side (e.g., through an RRC re-establishment procedure or an RRC establishment procedure) is recovered, the UE can inform the network side by using an RRC message that there is an available radio link failure report thereon (for example, indicated by an rlf-InfoAvailable information element). After receiving the indication, the network side may request, by using an RRC message (for example, an rlf-ReportReq information element in a UEInformationRequest message to indicate the request), the UE to report the radio link failure report stored thereby. The UE will report the stored radio link failure report (the rlf-Report information element in the UEInformationResponse message) to the network side in a response RRC message. The radio link failure report obtained by the network side is used for network optimization, such as network coverage and mobility robustness optimization. The radio link failure report may include: measurement results of a source cell and neighbor cell(s) available when a link fails, location information, the identity of a primary cell where the link failure occurs, the type of the link failure (e.g., RLF or HOF), an RLF cause, an elapsed time between the link failure and radio link failure reporting (timeSinceFailure information element), an elapsed time between reception of a last handover command to perform a handover procedure and the link failure (referred to as a timeConnFailure information element), random access procedure information, etc. The link failure report, VarRLF-Report, and connection failure information are equivalent to each other.

As previously described, one of the objectives of the new research project of Release 17 is to introduce handover information reporting of a successful handover. This is because, in an NR system, performing network optimization by using only an RLF report in an existing mechanism may cause a data acquisition process to become lengthened, and handover information reporting in the case of a successful handover enables the network side to acquire a sufficient number of samples in a mobility procedure more quickly. Second, even for a successful handover scenario, a mobility parameter thereof also needs to be further optimized. A successful handover information report may include an RLF monitoring situation, such as an operation situation of T310/T312, an RLC retransmission status, etc., when the handover command is received, may also include a beam failure monitoring situation, such as a beam failure instance count value (BFI_COUNTER) (or whether a configured maximum value has been reached), a status/value of a beam failure monitoring timer, a measured value (e.g., RSRP/RSRQ/SINR) of a reference signal for beam failure monitoring, etc., when the handover command is received, and may also include one or more best downlink beam identifiers when random access to the target base station is performed; and an operation status/value of the timer T304 upon successful completion of the handover. Success of the handover means that an RRC reconfiguration complete message for responding to a handover command RRC reconfiguration message with respect to the target base station has been successfully transmitted, or that a random access procedure to the target base station has been successfully completed at a MAC layer. Regarding handover information reporting in a successful handover scenario, it is currently unclear how the UE determines the RLC retransmission status. In addition, in scenarios of DAPS handovers in Release 16 and conditional handovers, how to enhance handover information reporting to enable the network side to acquire sufficient mobility test information has become a problem that the present disclosure is interested in. The following embodiments provide a solution to the above problems. The embodiments are not mutually exclusive, and some embodiments may be combined. If not otherwise specified, some concepts or definitions are commonly applicable among the embodiments. The handover information report is also referred to as a successful handover report, handover report information, handover information, etc., and the name thereof is not limited in the present disclosure.

Embodiment 1

This embodiment provides a method used by UE to determine an RLC retransmission status in handover information reporting in a successful handover scenario.

Figure 3:
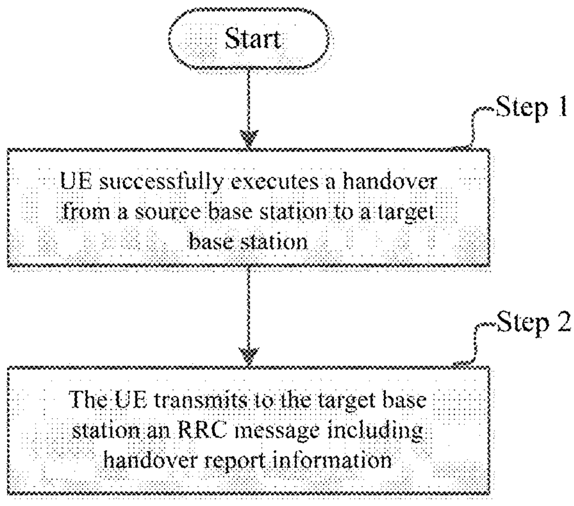
FIG. 3 is a flowchart showing an example of a handover information reporting method according to the present disclosure.

FIG. 3 is a flowchart showing an example of a handover information reporting method according to the present disclosure. As shown in FIG. 3, in this embodiment, in step 1, UE successfully executes a handover from a source base station to a target base station. In this scenario, in step 2, the UE transmits to the target base station an RRC message including handover report information of a successful handover procedure. The message includes an information element for indicating an RLC retransmission status.

In an implementation manner, as an example, the RLC retransmission status may refer to the maximum value of all count values RETX_COUNT of an RLC layer of the UE for recording the number of retransmissions of an RLC service data unit (SDU) or an RLC protocol data unit (PDU). That is, when each RLC SDU or PDU is associated with one RETX_COUNT value, preferably the RLC retransmission status refers to the maximum value of all RETX_COUNT values associated with RLC SDUs or PDUs.

In another implementation manner, as an example, the RLC retransmission status may refer to an average value of all count values RETX_COUNT of the RLC layer of the UE for recording the number of retransmissions of an RLC SDU or an RLC PDU. That is, when each RLC SDU or PDU is associated with one RETX_COUNT value, preferably the RLC retransmission status refers to an average value of all RETX_COUNT values associated with RLC SDUs or PDUs.

In yet another implementation manner, as an example, the RLC retransmission status may refer to the number of those transmitted RLC SDUs or PDUs of the RLC layer of the UE of which a corresponding feedback has not been received yet. The feedback refers to an ACK/NACK feedback of the RLC layer included in an RLC status report, and is used to indicate whether one or more corresponding RLC data packets have been correctly received by a peer.

Preferably, the RLC SDU or PDU is for all radio bearers including all data radio bearers (DRBs) and signaling radio bearers (SRBs). Alternatively, the RLC SDU or PDU is for all DRBs.

Alternatively, if the UE is configured with and has activated carrier aggregation duplication, the RLC SDUs or PDUs do not include those RLC SDUs or PDUs of which corresponding logical channel allowed serving cells (an allowedServingCells information element) include only a secondary cell (SCell). Alternatively, if the UE is configured with and has activated carrier aggregation duplication, the RLC SDUs or PDUs do not include those RLC SDUs or PDUs of which corresponding logical channel allowed serving cells (an allowedServingCells information element) include a secondary cell (SCell), that is, include only those RLC SDUs or PDUs of which corresponding logical channel allowed serving cells (an allowedServingCells information element) include only a primary cell (PCell). The allowedServingCells information element includes a serving cell list, and is used to indicate that an uplink MAC SDU from an associated logical channel can be mapped to only a serving cell indicated by the serving cell list so as to be transmitted.

Alternatively, the above RLC retransmission status depends on the radio bearer. That is, the RLC retransmission status is a list including one corresponding RLC retransmission status value for each radio bearer. The list may include all radio bearers of the UE, or may include only some radio bearers of the UE. If a request instruction for requesting the UE to report handover information includes a radio bearer identifier to instruct the UE to report an RLC retransmission status associated with the radio bearer identifier, then the some radio bearers of the UE included in the report list refer to associated radio bearers associated with the requested radio bearer identifier.

Preferably, after receiving an RRC message from a base station including an instruction for requesting reporting of handover report information after a successful handover, the UE transmits the handover report information to the base station. Preferably, upon successful completion of the handover, the UE notifies the base station that the UE has the stored successful handover report information.

Preferably, after receiving a handover command, the UE sets or stores the RLC retransmission status in a handover information report when applying the handover command to trigger a handover procedure. The RLC retransmission status is related to a source cell, that is, corresponds to the source cell when the UE triggers a handover upon receiving the handover command.

Alternatively, the handover report information after the successful handover further includes cell identifiers and/or carrier frequency information corresponding to the source base station and the target base station of the handover.

Embodiment 2

This embodiment provides a handover information reporting method of UE in a successful DAPS handover scenario. By means of the method of this embodiment, a base station can acquire a status of a source base station link when a handover is successfully completed in the case of a DAPS handover, thereby better optimizing a mobility parameter of the DAPS handover, and enabling the UE to better utilize a source base station link to reduce a handover latency and a packet loss rate during a DAPS handover procedure.

In this embodiment, if a handover executed by the UE is a DAPS handover, then the UE includes one or more of the following information in a handover information report of the successful handover:

Information 1: an RLC retransmission status value related to the source base station upon successful completion of the handover. Regarding the RLC retransmission status value, reference may be made to Embodiment 1, but the RLC retransmission status value is not limited to the description in Embodiment 1.

Information 2: a T310 operation status value related to the source base station upon successful completion of the handover.

Information 3: a beam monitoring situation related to the source base station upon successful completion of the handover, such as a beam failure instance count value (BFI_COUNTER) (or whether a configured maximum value has been reached), a status/value of a beam failure monitoring timer, a measured value (e.g., RSRP/RSRQ/SINR) of a reference signal for beam failure monitoring, etc.

Information 4: information for indicating a source base station RLF. Preferably, the information indicates that an RLF occurs on the source base station link during the DAPS handover procedure. Alternatively, the information indicates an elapsed time between triggering of the handover and detection of the source base station RLF. The triggering of the handover may also be expressed as that the UE receives a handover command.

Preferably, the UE includes or sets the above information in the handover information report upon successful completion of the handover. Alternatively, the UE includes or sets the above information in the handover information report when the UE performs source base station releasing upon receiving an RRC message including a source base station releasing instruction.

Optionally, if the handover executed by the UE is a DAPS handover, then the UE includes the following information in the handover information report of the successful handover:

Information 5: an RLC retransmission status value related to the source base station when source base station releasing is performed upon receipt of an RRC message including a source base station releasing instruction. Regarding the RLC retransmission status value, reference may be made to Embodiment 1, but the RLC retransmission status value is not limited to the description in Embodiment 1.

Information 6: a T310 operation status value related to the source base station when source base station releasing is performed upon receipt of an RRC message including a source base station releasing instruction.

Information 7: a beam monitoring situation related to the source base station when source base station releasing is performed upon receipt of an RRC message including a source base station releasing instruction, such as a beam failure instance count value (BFI_COUNTER) (or whether a configured maximum value has been reached), a status/value of a beam failure monitoring timer, a measured value (e.g., RSRP/RSRQ/SINR) of a reference signal for beam failure monitoring, etc.

Preferably, the UE includes or sets the above information in the handover information report when the UE performs source base station releasing upon receiving an RRC message including a source base station releasing instruction.

Obviously, before the above operation, the method further includes: the UE receiving a handover command including a DAPS configuration, and performing the handover procedure. The handover executed by the UE being a DAPS handover means that the UE performs the above operation when configured with DAPS. The DAPS configured for the UE can also be described as that the UE is configured with any one or a plurality of DAPS bearers; or any one or a plurality of DRBs of the UE are configured with DAPS (e.g., identified by a daps-Config information element). The DAPS bearer refers to that the bearer DRB is configured with an information element for indicating a daps configuration, such as a daps-config information element. Preferably, the daps-config information element is separately configured for each DRB.

Embodiment 3

This embodiment provides a handover information reporting method of UE in a successful conditional handover scenario. By means of the method, a base station can acquire the situation of a conditional handover candidate cell at a handover, so as to more accurately configure a suitable conditional handover candidate cell and a suitable execution condition for the UE.

In this embodiment, if the UE is configured with a conditional handover, then the UE includes one or more of the following information in a handover information report of the successful handover:

Information 1: a measurement result acquired for an execution condition of each conditional handover configuration (e.g., identified by a conReconfigId information element) upon initiation of the handover, i.e., a result of measurement for the conditional handover candidate cell performed according to a conditional handover execution condition corresponding to the conditional handover identifier.

Information 2: a status of an execution condition corresponding to each conditional handover configuration (e.g., identified by a conReconfigId information element) upon initiation of the handover. The status refers to a status of whether the configured one or two execution conditions corresponding to one conditional handover candidate cell (or a conditional handover identifier) are satisfied. For example, if the one or two execution conditions corresponding to one conditional handover candidate cell are both satisfied, then the status of the execution condition is set to that the execution condition is satisfied, and if none of the one or two execution conditions corresponding to one conditional handover candidate cell is satisfied, then the status of the unsatisfied execution condition is set to that the execution condition is not satisfied. Preferably, the identifier of the execution condition, e.g., a measurement identifier measID, is included. It can be seen from the above that information 2 further includes a conditional reconfiguration identifier for association with the status of the execution condition.

Information 3: a list of all conditional handover candidate cells meeting a corresponding execution condition in a conditional handover configuration upon initiation of the handover, i.e., a conditional handover triggering cell list. Preferably, the triggering cell list includes one or more cell identifiers for identifying conditional handover candidate cells. The cell identifier is a cell global identifier (CGI) or a physical cell identifier (PCI) or a corresponding carrier frequency thereof. Alternatively, the triggering cell list includes one or more conditional reconfiguration identifiers (e.g., identified by a conReconfigId information element) for identifying conditional reconfigurations corresponding to the conditional handover candidate cell.

Information 4, used to indicate that a stored RRC reconfiguration message corresponding to a handover candidate cell and applied due to execution of a conditional handover procedure is generated in a cell selection procedure performed during operation of T311. Preferably, information 4 is an enumeration type, and is, for example, set to TRUE to represent information 4.

Preferably, information 2 is included in the handover information when one or two of the corresponding handover conditions are satisfied, and information 3 is included in the handover information when it is determined that the corresponding conditional handover candidate cell is a triggering cell, that is, all triggering events associated with the cell are satisfied. Information 4 for execution of the conditional handover procedure is included in the handover information if the cell selected in the cell selection procedure during operation of T311 is a conditional handover candidate cell of the UE.

The time of handover initiation refers to the time when the UE triggers the handover procedure. Preferably, in the case of a non-conditional handover, the time of handover initiation refers to the time when the UE receives a handover command, and in the case of a conditional handover, the time of handover initiation refers to the time when the UE selects a conditional handover triggering cell and executes a stored conditional handover configuration corresponding to the cell. Preferably, the UE includes the above information in the handover information report upon initiation of the handover. Alternatively, the UE includes the above information in the handover information report upon successful completion of the handover.

The UE being configured with a conditional handover may also mean that the UE has a stored conditional handover configuration. In the present disclosure, the handover may be a non-conditional handover, i.e., a handover type where the UE, upon receiving a handover command, immediately applies an RRC configuration in the handover command to perform random access to the target base station. The handover may also be a conditional handover, i.e., the handover procedure occurs due to the UE executing a stored conditional handover configuration according to the stored conditional handover configuration.

Embodiment 4

Figure 4:
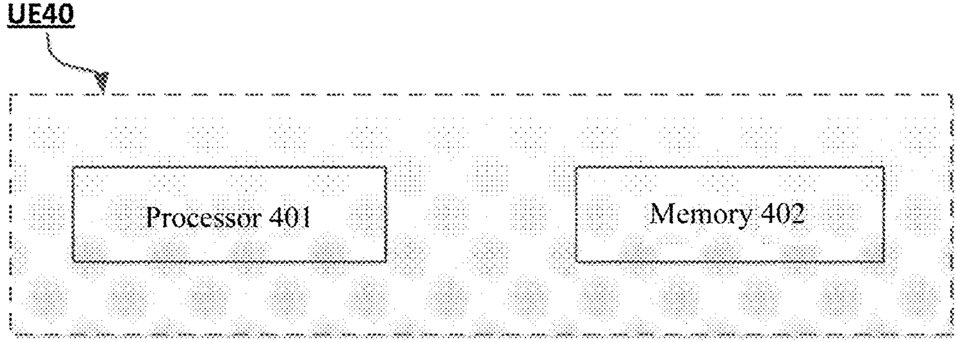
FIG. 4 is a block diagram showing user equipment (UE) related to the present disclosure.

In this embodiment, user equipment according to the present disclosure is described. FIG. 4 is a block diagram showing user equipment (UE) according to the present invention. As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or other memories. The memory 402 stores program instructions. When run by the processor 401, the instructions can perform various methods of radio link failure reporting in the case of a DAPS handover described above in detail in the present invention.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art could make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (e.g., monolithic or multi-piece integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by a user equipment (UE), the method comprising:

executing a Dual Active Protocol Stack (DAPS) handover from a source base station to a target base station;

accessing the target base station by a random access procedure to the target base station;

storing information in a successful handover report upon successful completion of the random access procedure at a medium access control (MAC) layer;

upon successful completion of the random access procedure, notifying the target base station that the UE has the stored information;

after the successful completion of the random access procedure, receiving, from the target base station, a radio resource control (RRC) message including an instruction for requesting the successful handover report; and in response to receiving the RRC message, transmitting an RRC message including the successful handover report to the target base station, wherein the stored information includes first information and second information, the first information indicates that a Radio Link Failure occurs on a link with the source base station during the DAPS handover, and the second information is a T310 operation status value related to the source base station upon the successful completion of the random access procedure.

2. A user equipment (UE), comprising:

a processor; and a memory storing instructions, wherein the processor is configured to run the instructions to:

execute a Dual Active Protocol Stack (DAPS) handover from a source base station to a target base station;

access the target base station by a random access procedure;

store information in a successful handover report upon successful completion of the random access procedure at a medium access control (MAC) layer;

upon successful completion of the random access procedure, notify the target base station that the UE has the stored information;

after the successful completion of the random access procedure, receive, from the target base station, a radio resource control (RRC) message including an instruction for requesting the successful handover report; and in response to receiving the RRC message, transmit an RRC message including the successful handover report to the target base station, wherein the stored information includes first information and second information, the first information indicates that a Radio Link Failure occurs on a link with the source base station during the DAPS handover, and the second information is a T310 operation status value related to the source base station upon the successful completion of the random access procedure.

3. The UE according to claim 2, wherein the stored information further includes third information that indicates an operation status of a timer T304 immediately after the successful completion of the random access procedure.

4. A base station acting as a target base station in a Dual Active Protocol Stack (DAPS) handover, comprising:

a processor; and a memory storing instructions, wherein the processor is configured to run the instructions to:

access a user equipment (UE) by a random access procedure between the UE and the target base station;

upon successful completion of the random access procedure, receive, from the UE, a notification that the UE has information stored in a successful handover report, the information being stored upon successful completion of the random access procedure at a medium access control (MAC) layer;

after the successful completion of the random access procedure, transmit, to the UE, a radio resource control (RRC) message including an instruction for requesting the successful handover report; and in response to transmitting the RRC message, receive an RRC message including the successful handover report from the UE, wherein the stored information includes first information and second information, the first information indicates that a Radio Link Failure occurs on a link with a source base station during the DAPS handover, and the second information is a T310 operation status value related to the source base station upon the successful completion of the random access procedure.

* * * * *